United States Patent
Noelle et al.

[11] Patent Number: 5,878,476
[45] Date of Patent: Mar. 9, 1999

[54] HIGH SPEED ATTACHMENT FOR MILLING MACHINES AND METHOD OF USE

[76] Inventors: John A. Noelle, 408 - 45 St. W.; Thomas J. Noelle, 1724 - 81 St. Northwest, both of Bradenton, Fla. 34209

[21] Appl. No.: 149,965

[22] Filed: Sep. 9, 1998

[51] Int. Cl.⁶ .............................. B23P 17/00; B23C 9/00
[52] U.S. Cl. .................... 29/469; 409/131; 409/230
[58] Field of Search ......................... 409/131, 230, 409/231, 135; 29/469; 408/238, 239 A, 147, 128; 451/294; 173/217

[56] References Cited

U.S. PATENT DOCUMENTS

| | | | |
|---|---|---|---|
| 3,641,873 | 2/1972 | Jacques | 409/185 |
| 4,077,736 | 3/1978 | Hutchens | 409/231 X |
| 4,679,970 | 7/1987 | Lohneis et al. | 408/128 |
| 4,716,657 | 1/1988 | Collingwood | 408/147 X |
| 5,562,373 | 10/1996 | Williangham et al. | 409/136 |

FOREIGN PATENT DOCUMENTS

| | | | |
|---|---|---|---|
| 4093106 | 3/1992 | Japan | 409/230 |
| 383544 | 8/1973 | U.S.S.R. | 409/220 |
| 645778 | 2/1979 | U.S.S.R. | 409/230 |

*Primary Examiner*—William Briggs
*Attorney, Agent, or Firm*—Dorthy S. Morse

[57] ABSTRACT

A variable speed milling machine attachment, and a method for its use, that is efficiently configured for minimal reduction of the spindle-to-table distance of a milling machine, such as the well-known Bridgeport miller, and which when attached to a milling machine having a maximum spindle speed of approximately 5,000 rpm, allows an operator to perform high speed milling, grinding, drilling, and engraving functions at selected sustained spindle speeds greater than 5,000 rpm, up to and including sustained spindle speeds in excess of 20,000 rpm. The attachment also has a visual display that provides an operator with indications of actual spindle speed for precise initial selection of the proper spindle speed for an intended machining task.

17 Claims, 4 Drawing Sheets

HIGH SPEED ATTACHMENT FOR MILLING MACHINES AND METHOD OF USE

BACKGROUND—FIELD OF INVENTION

This invention relates to attachments for milling machines, specifically to a variable speed milling machine attachment, and a method for its use, that is efficiently configured for minimal reduction of the spindle-to-table workspace of a milling machine, such as the well-known Bridgeport miller, and which when attached to a milling machine having a maximum spindle speed of approximately 5,000 rpm, allows an operator to perform high speed milling, grinding, drilling, and engraving functions at selected sustained spindle speeds greater than 5,000 rpm, up to and including sustained spindle speeds above 20,000 rpm.

BACKGROUND—DESCRIPTION OF PRIOR ART

Milling machines of varying complexity and capability are commonly used in both large machine shops and smaller tool rooms to provide a variety of milling functions. While some automated milling machines can be very expensive, they generally provide an increased number of functions, more versatility, and more efficient operation than their less expensive automated and manually-operated counterparts. Attachments are available to add functional capabilities to the milling machines having a smaller range of machine and CNC controller options, however, known milling machine attachments for high speed machining function are typically bulky and noisy, and they can significantly reduce the spindle-to-table distance within which the operator is able to work. It is not known to have a milling machine attachment for high speed milling, grinding, drilling and engraving functions which can provide sustained maximum spindle speeds above 5,000 rpm under varying loads, in a sufficiently compact form that minimizes reduction of the spindle-to-table workspace available to an operator, and also provides the operator with a visual display of actual spindle speed.

SUMMARY OF INVENTION—OBJECTS AND ADVANTAGES

It is the primary object of this invention to provide an attachment for a wide variety of milling machines, such as the well-known Bridgeport miller, with which an operator can perform high speed functions to include but not be limited to milling, grinding, drilling, and engraving at sustained spindle speeds greater than 5,000 rpm, up to and including sustained spindle speeds above 20,000 rpm. A further object of this invention is to provide a high speed milling machine attachment which minimizes the expense of high speed operation. It is also an object of this invention to provide a high speed milling machine attachment which is compact in form so as to minimally reduce the spindle-to-table distance within which the operator is able to work. A further object of this invention is to provide a high speed milling machine attachment for which the speed can be infinitely varied to achieve constant spindle speeds during use under varying loads, and which readily identifies for the operator the actual speed of spindle rotation to aid the operator in initially selecting the proper spindle speed for each intended use. It is also an object of this invention to provide a high speed milling machine attachment which has an oil spray cooling means which is configured to divert upwardly moving excess oil away from the drive belt connected between the motor drive shaft and the bearings.

As described herein, properly manufactured and installed on the existing quill of a milling machine having a maximum spindle speed of less than 5,000 rpm, the present invention would provide a means for achieving high speed milling, grinding, drilling, and engraving at sustained spindle speeds above 5,000 rpm under varying loads, up to and including sustained spindle speeds above 20,000 rpm. The present invention comprises two subassemblies connected by a drive belt and a motor support bracket. Since its motor subassembly is offset from its bearing cartridge and outer housing subassembly, the present invention would minimally reduce the spindle-to-table workspace of the milling machine to which is was attached. The first subassembly of the present invention has an outer housing with a bore through its upper surface that is configured and dimensioned for attachment to milling machine quills, such as that of a Bridgeport miller. It is this connection of the bore to the quill that provides support for the two subassemblies during use. Axially aligned within the lower portion of the outer housing, and also axially aligned with one another, the preferred embodiment of the first subassembly also comprises a bearing cartridge, a collet chuck having an integral shaft positioned to extend vertically through the upper and lower surfaces of the bearing cartridge, and a pulley that is connected to the integral shaft, near to its upper end. One end of the elongated and substantially horizontal motor support bracket is connected around the lower portion of the outer housing, while its other end can either directly or indirectly support the motor used to drive the high speed spindle rotation. In the preferred embodiment of the present invention indirect motor support is accomplished through a drive shaft housing that is positioned between the motor and the motor support bracket, with the motor support bracket being connected with detachable fasteners to the bottom surface of the drive shaft housing. Thus, the preferred embodiment of the second subassembly comprises a motor, a drive shaft connected to the motor, and a drive shaft housing positioned around the drive shaft and supporting the motor. The preferred embodiment of the present invention also has a drive ratio of 1:1, and a drive belt that is operably positioned for revolution around the pulley connected to the integral shaft, as well as around a second pulley connected to the drive shaft of the motor. Additional drive belt configurations are contemplated for preferred embodiments having different drive ratios other than 1:1. During operator use of the present invention, the combined interaction of the revolving drive belt, the integral shaft, the bearings, and the collet chuck or other similar high speed chuck which depends downwardly from the lower end of the integral shaft, drives the rotation of a selected high speed machining tool connected to the collet chuck and thereby allows the operator to perform a variety of high speed milling, grinding, drilling, and engraving functions. The motor is electrically connected to an infinitely variable speed control device, which together can induce sufficient motor drive shaft rotation to cause sustained spindle speeds in excess of 5,000 rpm, up to and including spindle speeds above 20,000 rpm. The variable speed control device is preferably configured to provide a visual display that readily indicates the actual spindle speed rotation to the operator through use of an easily readable marked dial or digital display that helps the operator initially select the proper spindle speed for the intended use. It is contemplated for the variable speed control device used to have feedback circuitry configured to automatically adjust spindle speeds under varying loads. A small lubrication port through the outer housing and the bearing cartridge provides a means through which an atomized mist of oil can be injected to cool the bearings. In the preferred embodiment, the support bracket would have a two-part construction to allow for ease in manufacture, as well as provide a slidable means for easy and prompt tension adjustment of the drive belt positioned between the motor and the bearings. The present invention requires only a small amount of air flow to carry the atomized mist of oil to the bearings to cool them, and therefore is less noisy to operate than known high speed milling attachments which require a high volume of air flow to provide the dual functions of driving the motor and cooling the bearings. A further benefit of the present invention is its reduced cost of use, since operation of a large compressor is not required. In addition, the present invention also reduces the expense of high speed operation in that it has no special electrical requirements and can be easily powered by the electrical service already available in most machine shops and tool rooms.

The description herein provides preferred embodiments of the present invention but should not be construed as limiting the scope of the milling machine attachment invention. For example, variations in the number and size of bearings used, the configuration of the first and second motor support bracket members, the type of motor used, the type and configuration of variable speed control used, the type of speed indicator used, and the type and dimension of drive belt used, other than those shown and described herein, may be incorporated into the present invention. Thus the scope of the present invention should be determined by the appended claims and their legal equivalents, rather than the examples given.

DETAILED DESCRIPTION OF PREFERRED EMBODIMENTS

Figure 1:
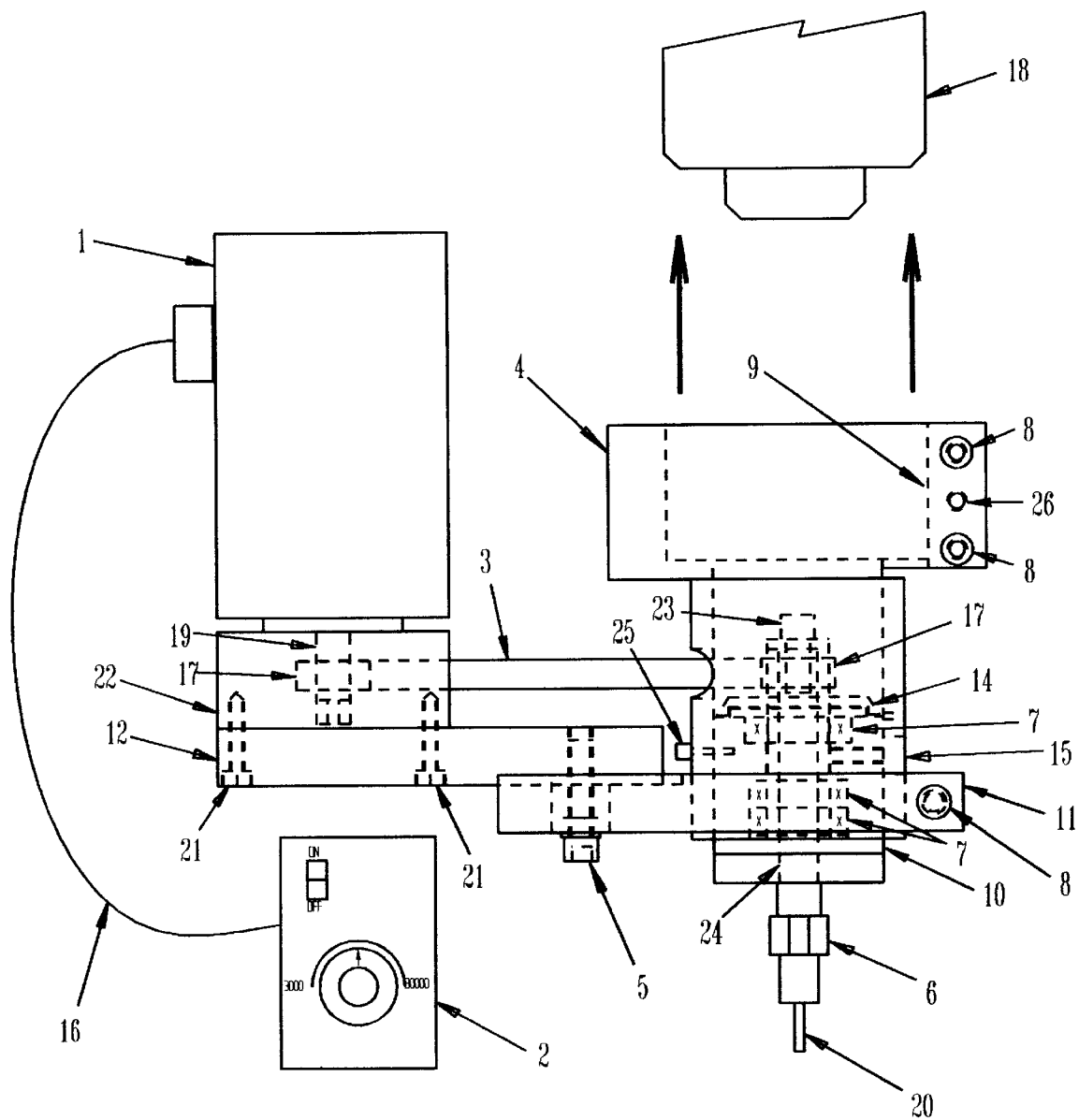
FIG. 1 is a sectional side view of a first preferred embodiment of the present invention having a two-piece support bracket construction and ready for attachment to the quill of a milling machine.

FIG. 1 shows a first preferred embodiment of a milling machine attachment invention which would be connected to a milling machine quill 18 during use and allow an operator (not shown) to perform high speed milling, grinding, drilling, and engraving functions on a milling machine otherwise limited to sustained spindle speeds of less than 5,000 rpm. In FIG. 1 the present invention is shown to comprise two vertically oriented subassemblies connected to one another by a drive belt 3, as well as a two-piece motor support bracket consisting of a first bracket member 12 and a second bracket member 11 which are slidably connected together by a fastener 5. In the preferred embodiment it is contemplated for fastener 5 to be configured so that it is easily manipulated by an operator (not shown) and that it provides a rapid adjustment means through which the operator can optimally adjust the tension on drive belt 3 between periods of use.

FIG. 1 shows one of the vertically oriented subassemblies attached to first bracket member 12 with several attachment screws 21, and comprising a motor 1, a motor drive shaft 19 connected through the lower end of motor 1, a pulley 17 operably positioned between drive belt 3 and the distal end of drive shaft 19 to support drive belt 3 during high speed revolution, and a drive shaft housing 22 within which drive shaft 19 is centrally inserted. FIG. 1 also shows a variable speed control 2 electrically connected to motor 1 by electrical wiring 16, but not actually supported by first bracket member 12. The length of electrical wiring 16 can be short when variable speed control 2 is positioned near motor 1, however it is also contemplated for electrical wiring 16 to be elongated so that variable speed control 2 can be placed in a location separate from motor 1 that is otherwise convenient for operator use. Although not critical to the present invention, in the preferred embodiment motor 1 is a universal brush-type motor, such as the AMETEK Model 11720-00 which is an approximately one-half horsepower motor having a maximum drive shaft rotational speed of approximately 30,000 rpm. However, it should be noted that it is also within the scope of the present invention for motor 1 to comprise other types of motors, such as a brushless direct current motor having a maximum drive shaft rotational speed of approximately 50,000 rpm. Also, although not critical to the present invention, a MINARIK Model XL1100 PWM Control is used in the preferred embodiment for variable speed control 2. However, a variable speed control 2 having a configuration more compact than that of the MINARIK Model XL1100 PWM Control is also contemplated. Without regard to the compactness of the particular type of variable speed control 2 used, it is contemplated for the variable speed control 2 of the preferred embodiment to have an easily readable marked dial or digital display so that the operator is able to see a quantified indication of the actual speed of rotation of tool 20 during initial selection of a proper spindle speed for each intended use. Variable speed control 2 should also have the internal feedback circuitry capable of automatically adjusting spindle speeds in reaction to varying loads, so that the proper spindle speed for an intended use can be sustained.

FIG. 1 further shows the second vertically oriented subassembly being aligned substantially parallel to the first vertically oriented subassembly and having an outer housing 4 with an upper bore 9 that is configured and dimensioned for secure attachment to milling machine quill 18. It is this connection of upper bore 9 to quill 18 that provides support for both of the subassemblies during use. FIG. 1 shows second bracket member 11 connected around the lower portion of outer housing 4. Such connection permits the first and second subassemblies to be supported by the second subassembly and for motor 1 to be positioned away from the spindle-to-table workspace (not shown) within which an operator (not shown) would perform various machining tasks. FIG. 1 also shows two clamping screws 8 and one jack screw 26 used to secure quill 18 within bore 9 of outer housing 4. The number of clamping screws 8 and jack screws 26 used in the present invention is not critical. For a precision fit of bore 9 around quill 18, as well as ease of connection, it is contemplated that jack screw 26 be utilized to prop bore 9 open during attachment of upper housing 4 to quill 18, after which clamping screws 8 would be used to tighten upper bore 9 around quill 18.

FIG. 1 also shows a plurality of bearings 7 within the interior cavity of a bearing cartridge 10 that is located within, and axially aligned with, the lower portion of outer housing 4. At least one fastening screw 25 would be connected through the side of the lower portion of outer housing 4 to securely fasten bearing cartridge 10 to outer housing 4 during use. In the preferred embodiment at least one clamping screw 8 also secures second bracket member 11 around the lower portion of outer housing 4. An integral shaft 24 is centrally positioned within bearing cartridge 10, with opposite ends that extend beyond the upper and lower surfaces of bearing cartridge 10. FIG. 1 shows a collet chuck 6 downwardly depending from the lower end of integral shaft 24. In addition, FIG. 1 shows a pulley 17 operably positioned between drive belt 3 and the upper end of integral shaft 24, with the combined rotation of pulley 17, integral shaft 24, and bearings 7 driving the rotation of collet chuck 6. Although FIG. 1 shows a cap screw 23 securing pulley 17 to integral shaft 24, cap screw 23 is not critical to the present invention and in the preferred embodiment it is contemplated to have any type of fastener that securely connects pulley 17 in place around integral shaft 24. Also, any type of high speed milling, grinding, drilling, or engraving tool, such as the tool 20 shown in FIG. 1, can be securely supported by collet chuck 6 during use. In the preferred embodiment of the present invention, the use of collet chuck 6 is not critical and it is also contemplated for any other type of high speed chuck to be used in support of tool 20. FIG. 1 further shows an oil slinger 14 and a lubrication port 15 connected through bearing cartridge 10. Lubrication port 15 allows for the inflow of a fine oil mist (not shown) to lubricate bearings 7 and cool them. Although not critical to the present invention, it is contemplated in the preferred embodiment for the oil mist to be delivered to lubrication port 15 by means of a small bore piece of flexible tubing, such as tubing 27 shown in FIG. 4. Oil slinger 14 has a tapered upper edge and is strategically positioned above bearings 7, near to drive belt 3 and adjacent to an oil exhausting aperture, shown as number 28 in FIG. 4, to divert upwardly moving excess oil (not shown) away from drive belt 3.

Although FIG. 1 shows the present invention having a 1:1 drive ratio, it is within the scope of the present invention to include other drive ratios. Also, in the preferred embodiment, although not critical, it is contemplated for motor 1 to have a maximum height dimension of approximately five inches and a maximum diameter dimension of approximately three inches. Further in the preferred embodiment and also not critical, it is contemplated for the lower portion of outer housing 4 to have a maximum height dimension of approximately three-and-one-half inches. In addition, in the preferred embodiment of the present invention and although not critical, it is contemplated for the first vertically oriented subassembly having motor 1 to extend vertically approximately two-and-one-half inches above the second vertically oriented subassembly comprising outer housing 4 and bearings 10, and for the center-to-center distance between the first vertically oriented subassembly and the second vertically oriented subassembly to be approximately six inches.

Figure 2:
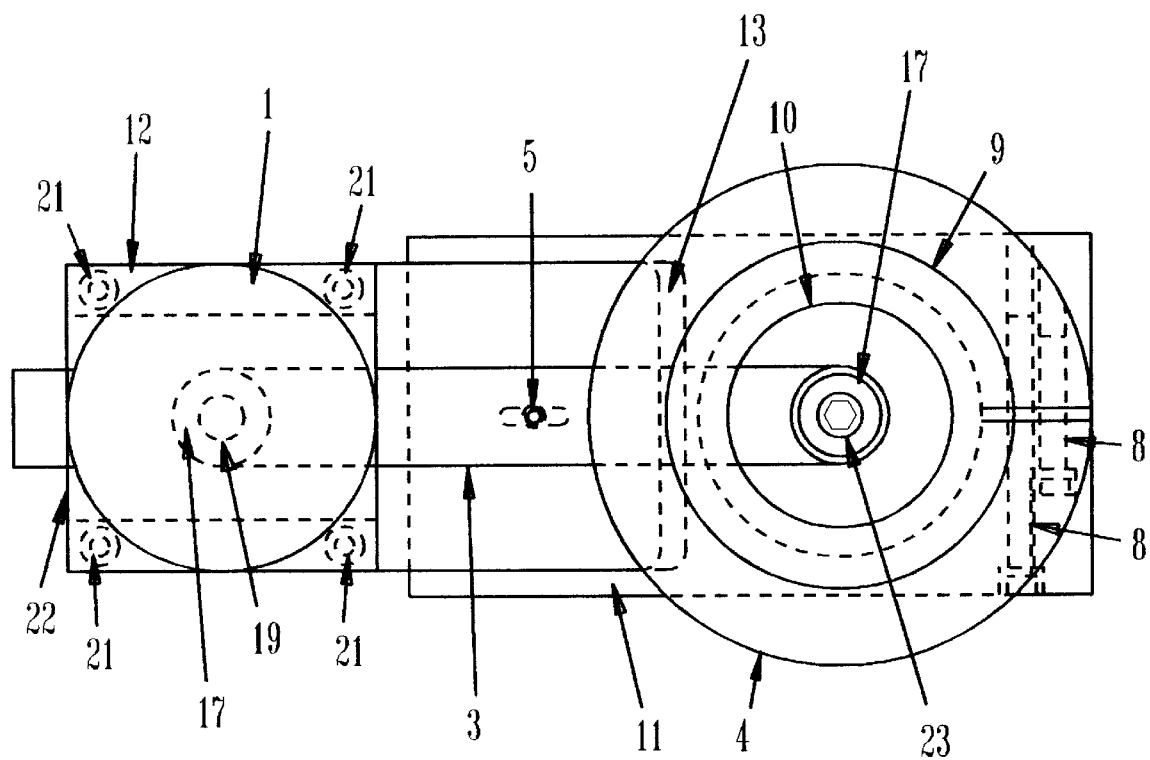
FIG. 2 is a top view of the first preferred embodiment.

FIG. 2 shows motor 1 positioned above drive shaft housing 22, and drive shaft housing 22 connected to first bracket member 12 with four attachment screws 21. The number of attachment screws 21 used is not critical to the present invention as long as the number is sufficient to securely attach drive shaft housing 22 to first bracket member 12 during machining use. FIG. 2 also shows outer housing 4 having a centrally positioned upper bore 9, with bearing cartridge 10 positioned within and axially aligned with the lower portion of outer housing 4. The clamping screw 8 shown in a rightmost position in FIG. 2 is used to secure outer housing 4 around the quill of a milling machine, such as quill 18 shown in FIG. 1. The clamping screw 8 shown in the leftmost position in FIG. 2 is used to secure second bracket member 11 around the lower portion of outer housing 4. FIG. 2 further shows drive belt 3 positioned operably around two pulleys 17, with motor drive shaft 19 axially aligned with and connected to a first of the two pulleys 17 and cap screw 23 securing integral shaft 24 (shown in FIG. 1 but not in FIG. 2) to the other pulley 17. In addition, FIG. 2 shows second bracket member 11 and first bracket member 12 slidably connected together by fastener 5. It is contemplated that fastener 5 be configured for easy manipulation to allow rapid tension adjustment of drive belt 3 between periods of use. The track 13 which facilitates sliding movement between second bracket member 11 and first bracket member 12 is shown in FIG. 2 as being located in second bracket member 11. However, it is within the scope of the present invention for track 13 to alternatively be formed in first bracket member 12, as well as to have other means for rapid tension adjustment of drive belt 3.

Figure 3:
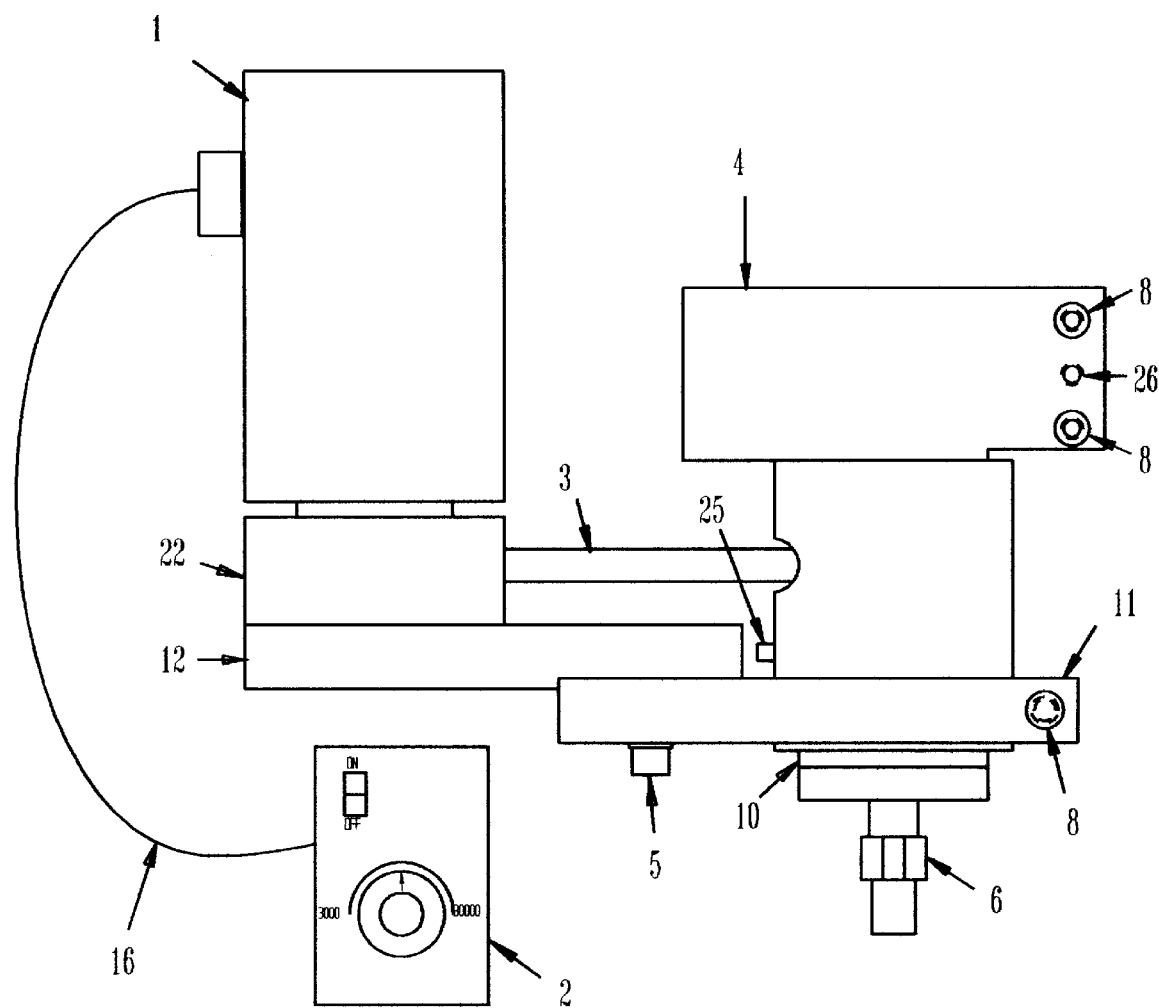
FIG. 3 is a side view of the first preferred embodiment.

FIG. 3 shows the vertical subassembly comprising motor 1 positioned above first bracket member 12, with drive shaft housing 22 connected therebetween, although it is within the scope of the present invention for first motor bracket member 12 to be configured for direct connection to motor 1. FIG. 3 also shows electrical wiring 16 connected between variable speed control 2 and motor 1. FIG. 3 further shows a second vertical subassembly positioned substantially parallel to the first subassembly and comprising outer housing 4, with the lower portion of outer housing 4 being encircled by one end of second bracket member 11. FIG. 3 further shows bearing cartridge 10 axially aligned with and extending downwardly beyond the lower portion of outer housing 4, with collet chuck 6 being axially aligned with bearing cartridge 10 and downwardly depending beyond the lower surface of bearing cartridge 10. Clamping screws 8 help to secure outer housing 4 around a milling machine quill, such as quill 18 shown in FIG. 1, as well as help second bracket member 11 to remain securely attached around the lower portion of outer housing 4 during machining use. FIG. 3 further shows one fastening screw 25 connected through the side of the lower portion of outer housing 4 for use in attaching bearing cartridge 10 to outer housing 4, as well as drive belt 3 positioned between drive shaft housing 22 and the lower portion of outer housing 4, with drive belt 3 being operably connected for revolution around two pulleys 17, as shown in FIG. 1. The number of fastening screws 25 used in the present invention is not critical and it is contemplated that more than one fastening screw 25 may be used. In addition, FIG. 3 shows a single fastener 5 connecting the upper surface of second bracket member 11 in its slidable engagement with the lower surface of first bracket member 12 to provide an easily manipulated tension adjustment means for drive belt 3.

Figure 4:
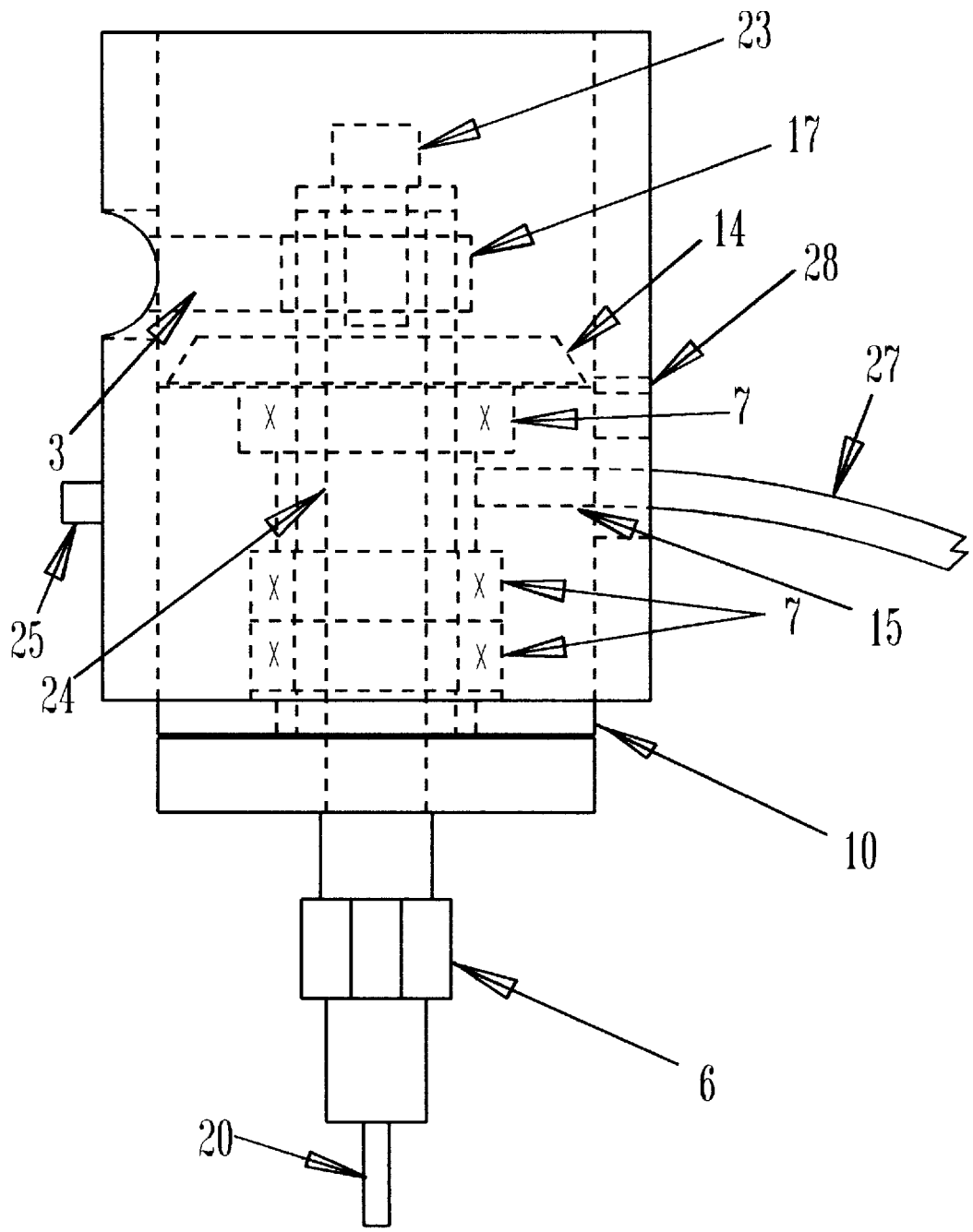
FIG. 4 is an enlarged sectional side view of the bearing cartridge and collet chuck of the first preferred embodiment of the present invention.

FIG. 4 shows bearing cartridge 10 in greater detail than it is shown in FIG. 1, and having a plurality of bearings 7 substantially occupying the interior cavity within bearing cartridge 10. FIG. 4 shows integral shaft 24 longitudinally centered within bearing cartridge 10 and extending beyond the upper and lower surfaces of bearing cartridge 10. At least one fastening screw 25 is inserted through the side of outer housing 4 and into bearing cartridge 10 to connect bearing cartridge 10 securely to outer housing 4 during use. FIG. 4 also shows one pulley 17 operably positioned between drive belt 3 and the upper end of integral shaft 24 with pulley 17 being secured in position by cap screw 23. FIG. 4 further shows bearings 7 each independently positioned concentrically around integral shaft 24, with oil slinger 14 having a tapered configuration and positioned above bearings 7 to discharge excess oil (not shown) away from drive belt 3 through oil exhausting aperture 28 in outer housing 4. FIG. 4 also shows lubrication port 15, through which a fine oil mist (not shown) may be introduced to bearings 7 to cool them. FIG. 4 shows one end of a piece of tubing 27 connected to lubrication port 15, through which the oil mist is released into bearing cartridge 10. Although not shown and not critical to the present invention, in the preferred embodiment it is contemplated for tubing 27 to be made from flexible materials. In addition, FIG. 4 shows collet chuck 6 downwardly depending below the lower surface of bearing cartridge 10 and a tool 20 downwardly depending from collect chuck 6. It is contemplated for tool 20 to comprise any type of high speed milling, grinding, drilling, or engraving tool, and for tool 20 to be securely supported by collet chuck 6 during use. In the preferred embodiment shown in FIG. 4, it is not critical to have collet chuck 6 support tool 4, and it is within the scope of the present invention to have any type of high speed chuck supporting tool 20 during use.

To use the preferred embodiment of the present invention, one would first insert quill 18 within upper bore 9 in outer housing 4, while simultaneously orienting the present invention so that motor 1 is positioned laterally away from quill 18 and removed as much as possible out of the spindle-to-table workspace of the milling machine (not shown) to which quill 18 is connected. Using clamping screws 8, the operator (not shown) would securely tighten the connection of outer housing 4 around quill 18. The tension on drive belt 3 would then be checked. Any adjustment needed would be made by sliding first bracket member 12 horizontally with respect to second bracket member 11 so that drive belt 3 is optimally tensioned for the intended machining use, after which second bracket member 11 would be secured to first bracket member 12 in the selected position using fastener 5. Variable speed control 2 would be connected to motor 1 with electrical wiring 16 and a selected tool 20 inserted and secured within collet chuck 6. The speed indicator on variable speed control 2 would then be used by the operator to initially set the desired rotational speed of tool 20 for the intended machining use. Sustained rotation of tool 20 under varying loads would be automatically achieved without operator intervention by feedback circuitry in variable speed control 2. During use, in the preferred embodiment bearings 7 would be cooled by an oil mist (not shown) introduced through lubrication port 15 by flexible tubing 27. Upwardly moving excess oil would be kept away from drive belt 3 through the use of an oil slinger 14 having a tapered upper edge which is positioned above bearings 7 and directs excess oil through an adjacent oil exhausting aperture 28 in outer housing 4. Should the need arise to disconnect drive belt 3 from drive shaft 19, drive shaft housing 22 could be separated from first bracket member 12 by removal of attachment screws 21. Further, the lower portion of outer housing 4 can be detached from second bracket member 11 by loosening the clamping screw 8 connected therethrough. In addition, by releasing fastening screw 25 which secures bearing cartridge 10 to outer housing 4, bearing cartridge 10 can be withdrawn from the lower portion of outer housing 4. Tools 20 are also easily exchanged between machining uses by rapid insertion and removal from collet chuck 6.

What is claimed is:

1. An attachment for connection to the quill of a milling machine otherwise incapable of sustaining rotational speeds in excess of 5,000 rpm, said attachment allowing an operator to use the milling machine to perform high speed milling, grinding, drilling, and engraving functions at rotational speeds greater than 5,000 rpm while at the same time minimally reducing the milling machine's spindle-to-table workspace, said attachment comprising an outer housing having a lower portion, an upper end, and a bore through said upper end, said bore being configured and dimensioned for secure attachment to a milling machine quill;

secure tightening means adapted for securing said upper end around the milling machine quill;

a plurality of bearings;

an inner housing compactly configured and dimensioned for housing said bearings so as to form a bearing cartridge, said bearing cartridge being centrally positioned within and axially aligned with said lower portion of said outer housing during use;

a motor having a drive shaft;

a drive belt connected between said motor and a shaft carried by said bearings;

a bracket configured and dimensioned for supporting said motor, said bracket positioned between said motor and said outer housing, said bracket being configured so that said motor can be positioned away from said housing and substantially outside the spindle-to-table workspace of the milling machine;

a machining tool attachment means adapted for connecting a machining tool to said bearings;

a variable speed control device connected to said motor and capable of causing said machining tool attachment means to rotate in excess of 5,000 rpm, said variable speed control device being adapted to allow sustained rotational speeds under varying loads, and said variable speed control device also being configured with a speed display which can be easily read by an operator and used by an operator to initially select a rotational speed proper for an intended machining use; and electrical connection means between said speed control device and said motor so that when a machining tool is connected to said machining tool attachment means and rotated in excess of 5,000 rpm it can provide high speed milling, grinding, drilling, and engraving functions on a milling machine that would otherwise be incapable of causing rotational speeds greater than 5,000 rpm.

2. The milling machine attachment of claim 1 wherein said bearing cartridge comprises an upper surface and a lower surface and said tool attachment means comprises a tool holding member with an integral shaft dimensioned to extend beyond said upper and lower surfaces of said bearing cartridge.

3. The milling machine attachment of claim 2 wherein said tool holding member is a high speed chuck.

4. The milling machine attachment of claim 1 further comprising a cooling means adapted for dissipating heat from said bearings, said cooling means being connected through said lower portion of said outer housing and said bearing cartridge.

5. The milling machine attachment of claim 4 wherein said cooling means comprises a lubrication port and a piece of flexible tubing, said tubing having a first end and being adapted for releasing a fine mist of oil from said first end, said first end being connected to said lubrication port for introducing the oil onto said bearings.

6. The milling machine attachment of claim 5 wherein said cooling means further comprises an oil slinger and said lower portion of said outer housing comprises an oil exhausting aperture, said oil slinger being axially aligned with said bearings for rotation therewith, said oil slinger also being positioned above said bearings near to said drive belt and having a tapered upper edge in communication with said aperture so that rotation of said oil slinger causes said tapered upper edge to release excess oil through said aperture thereby keeping upwardly moving excess oil from the mist away from said drive belt.

7. The milling machine attachment of claim 1 wherein said bracket comprises a two-piece sliding configuration which is adjustable in length for allowing rapid tension of said drive belt.

8. The milling machine attachment of claim 7 wherein said two-piece sliding configuration further comprises a first support member having a bottom surface, a second support member having a top surface, a track positioned within said top surface and adapted for guiding movement of said bottom surface across said top surface between positions of maximum extension and maximum contraction, and a fastener connected between said first support member and said second support member, said fastener being adapted to place said first member and said second support member into a fixed position relative to one another between said positions of maximum extension and maximum contraction.

9. The milling machine attachment of claim 1 further comprising at least one jack screw connected to said outer housing and configured to allow a precision fit of said bore around the quill of a milling machine.

10. The milling machine attachment of claim 1 having a drive ratio of 1:1 and further comprising two pulleys adapted for connecting said drive belt between said motor and said bearings.

11. The milling machine attachment of claim 10 wherein said motor is selected from the group consisting of an approximately one-half horsepower universal brush-type motor adapted for causing rotation of said drive shaft up to an in excess of 20,000 rpm and a brushless direct current motor adapted for causing rotation of said drive shaft up to and including 5,000 rpm.

12. The milling machine attachment of claim 1 further comprising a separate drive shaft housing positioned between said bracket and said motor, and also comprising a plurality of attachment screws adapted for securely connecting said drive shaft housing to said bracket, said drive shaft housing being releasably connected to said bracket during use.

13. The milling machine attachment of claim 1 wherein said speed display comprises an easy-to-read digital array.

14. A method for allowing a milling machine incapable of sustaining rotational speeds in excess of 5,000 rpm to be used to perform high speed machining functions at rotational speeds greater than 5,000 rpm, said method comprising the steps of providing a first subassembly comprising a motor, a drive shaft, a variable speed control having a visual speed display, a drive shaft housing, and a first bracket support member;

further providing a second subassembly comprising a bearing cartridge, an outer housing with an upper bore, a high speed chuck, an integral shaft, and a second bracket support member; and further providing a milling machine quill, a drive belt, a plurality of high speed machining tools, a plurality of fasteners, and a plurality of clamping screws;

inserting the milling machine quill into said upper bore in said outer housing to support said first and second subassemblies;

using at least one of said clamping screws to tighten said upper bore around said quill;

using at least one of said fasteners to secure said bearing cartridge within said outer housing;

operably positioning said drive belt between said drive shaft in said first subassembly and said integral shaft in said second subassembly;

adjusting optimum drive belt tension by sliding said first bracket support member horizontally with respect to said second bracket support member and securing one to the other in a desired position using one of said fasteners;

inserting and securing a selected one of said machining tools within said high speed chuck;

using said visual speed display and said variable speed control to initially select a desired optimal rotational speed for said drive shaft prior to each intended machining use; and engaging said motor to provide drive shaft rotation greater than 5,000 rpm to rotate the machining tool positioned within said high speed chuck at sustained speeds greater than 5,000 rpm under varying loads for use in the performance of high speed machining functions.

15. The method of claim 14 further comprising the steps of providing a piece of flexible tubing through the distal end of which a fine atomized oil mist is released, providing an outer housing and a bearing cartridge each having a lubrication port, positioning said lubrication ports so that they communicate with one another and also communicate with said bearings, and the step of connecting the distal end of said flexible tubing to said lubrication port.

16. The method of claim 15 wherein said step of providing a piece of flexible tubing through the end of which a fine atomized oil mist is released further comprises the step of providing a low amount of air flow to deliver said fine atomized mist through said flexible tubing.

17. The method of claim 16 further comprising the steps of providing an oil slinger with a tapered upper edge, providing an outer housing having an oil exhausting aperture, and positioning said oil slinger for synchronized rotation with said bearings and so that upwardly moving excess amounts of said oil mist are transported by said tapered upper edge through said oil exhausting aperture and away from said drive belt.

* * * * *